United States Patent [19]

Layer et al.

[11] 4,292,237
[45] Sep. 29, 1981

[54] POLYMERIC ULTRAVIOLET LIGHT STABILIZERS CONTAINING HINDERED ALKYL AMINES

[75] Inventors: Robert W. Layer, Cuyahoga Falls; Pyong N. Son, Akron, both of Ohio

[73] Assignee: The B. F. Goodrich Company, Akron, Ohio

[21] Appl. No.: 850,994

[22] Filed: Nov. 14, 1977

[51] Int. Cl.³ .............. C07D 215/06; C08K 5/34; C07D 215/12; C07D 215/14
[52] U.S. Cl. .............. 260/45.8 NW; 525/203; 526/259; 526/263; 546/164
[58] Field of Search .............. 260/45.8 NW, 283 T, 260/287 T, 878 R, 880 R; 526/259, 263 (U.S. only); 525/203; 546/164

[56] References Cited

U.S. PATENT DOCUMENTS

| | | | |
|---|---|---|---|
| 2,623,879 | 12/1952 | Ringwald et al. | 526/259 |
| 2,727,021 | 12/1955 | Price | 526/263 |
| 2,998,468 | 8/1961 | Wilde | 260/45.8 NW |
| 3,637,745 | 1/1972 | Heller et al. | 260/45.8 NW |
| 3,752,868 | 8/1973 | Kaku et al. | 260/878 R |
| 3,776,912 | 12/1973 | Sturm et al. | 260/287 T |
| 3,817,749 | 6/1974 | Kitahara et al. | 526/259 |
| 3,956,216 | 5/1976 | Tucker | 526/259 |
| 4,012,362 | 3/1977 | Reiff et al. | 260/283 R |
| 4,069,195 | 1/1978 | Layer et al. | 260/45.8 NW |
| 4,073,770 | 2/1978 | Son et al. | 260/45.8 NW |
| 4,076,526 | 2/1978 | Mulvaney et al. | 526/263 |
| 4,077,975 | 3/1978 | Trofimov et al. | 526/259 |
| 4,082,706 | 4/1978 | Danielson | 260/45.8 NW |
| 4,233,430 | 11/1980 | Jacquet et al. | 526/259 |

Primary Examiner—Howard E. Schain
Assistant Examiner—R. A. White
Attorney, Agent, or Firm—John H. Faro

[57] ABSTRACT

An ultraviolet light sensitive polymer composition wherein resistance to photodegradation is enhanced by the inclusion therein of a stabilizer polymer having structural units corresponding to the following formula

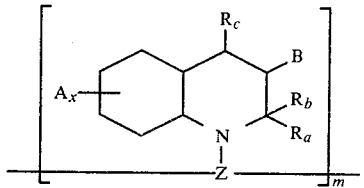

wherein $R_a$, $R_b$, and $R_c$ are independently selected from alkyl groups containing 1 to about 12 carbon atoms, a cyclohexyl group, or cyclohexylalkyl groups containing 7 to about 14 carbon atoms; A is selected from the group consisting of alkyl groups containing 1 to about 24 carbon atoms, hydroxyalkyl groups containing 1 to about 18 carbon atoms, alkoxy groups containing 1 to about 12 carbon atoms in the group, ester groups containing a total of from 2 to about 24 carbon atoms in the group, a cyclohexyl group, cyclohexylalkyl groups containing 7 to about 14 carbon atoms in the group, hydroxy groups, amino groups and aminoalkyl groups and alkyl-substituted amino and aminoalkyl groups wherein the alkyl contains 1 to about 12 carbon atoms; Z is a segment of the polymer backbone derived from an olefinic monomer; x is 0, 1, 2 or 3 and B is hydrogen, an alkyl group containing 1 to about 12 carbon atoms, a cyclohexyl group, or a cyclohexylalkyl group of 7 to about 14 carbon atoms in the group; and m is at least 2. The above stabilizer polymer can be simply combined with, or engrafted upon, the ultraviolet light sensitive polymer. The stabilizer polymer may also be copolymerized with, or grafted upon other polymeric materials thereby enhancing its phase compatability with the ultraviolet light sensitive polymer. In certain instances, it is also possible to copolymerize the monomers from which are derived the ultraviolet light sensitive polymer and the stabilizer polymer.

9 Claims, No Drawings

POLYMERIC ULTRAVIOLET LIGHT STABILIZERS CONTAINING HINDERED ALKYL AMINES

BACKGROUND OF THE INVENTION

1. Field of the Invention

This invention is directed to compositions and a method. More specifically, this invention concerns itself with ultraviolet light sensitive polymer compositions having enhanced resistance to photodegradation, and methods for enhancing the resistance of ultraviolet light sensitive polymers to photodegradation.

2. Description of the Prior Art

Polymers have in the past and continue to provide an attractive substitute for other more traditional types of structural materials (e.g. wood and metals) because of relatively inexpensive materials and fabrication costs. As polymers continue to find new applications in, for example, the fabrication of automotive parts and building materials, they must also become more durable and capable of withstanding prolonged exposure to a variety of degradative forces. Degradation of polymers can be caused by exposure to light, heat and/or air. Such degradation is usually manifest by either a partial or total loss of structural integrity, changes in light transmission properties, changes in color, loss or reduction in flexibility and/or resiliency, or any combination of the above phenomenon. Those attempting to avoid polymer degradation have generally selected from among three possible approaches: (a) elimination or reduction of the degradative forces; (b) isolation of the sensitive polymer material from the degradative forces; or (c) modification of the polymer composition to enhance its resistance to degradative forces. The latter approach is generally preferable since it does not require elaborate engineering or structural changes in the polymer product environment.

There are a variety of additives which have been disclosed as suitable for enhancing the resistance of polymers to one or more of the degradative forces discussed hereinabove. These additives (hereinafter referred to as "stabilizers") can be physically combined with or engrafted upon the environmentally sensitive polymer, thereby prolonging its useful life in the hostile degradative environment. In those instances where the stabilizer is merely physically dispersed throughout the polymer, it is generally free to migrate within the composition (unless, of course, its relative molecular size inhibits such diffusion). As will be appreciated, this problem of stabilizer diffusion can be further aggravated when the polymer composition is in continuous or periodically contacted with fluids. Such fluid contact can result in the leeching out or removal of some of the stabilizer from the polymer by the solvent action of the fluid and/or the anisotropic distribution of the stabilizer within the polymer composition. The removal and/or redistribution of stabilizer within the polymer can leave the unstabilized region of the polymer vulnerable to attack by degradative forces. Thus, it will be appreciated that stabilizers which are inhibited from migration and/or diffusion within the polymer are generally preferred.

Stabilizers are available which can enhance the polymers resistance to more than one of the degradative forces and conversely, a stabilizer which is effective for prevention of, for example, oxidative degradation may have little if any effect upon the polymers resistance to other degradative agents. Thus, it is not uncommon for polymers to contain a variety of stabilizer materials, each being present for the prevention of a particular degradative reaction.

One of the more difficult to control of the degradative forces is irradiation of the polymer by ultraviolet light. The impact of such irradiation will of course vary depending upon the intensity and duration of exposure and thus may manifest itself only after a prolonged interval. The irradiation of polymers with ultraviolet light can often times cause cross-linking of these materials thereby reducing its resiliency and/or impact resistance. Changes in color and opacity are also often affected by prolonged exposure of the polymer to ultraviolet light. While many materials are known, and commercially available, as stabilizers against ultraviolet light degradation, the degree of protection afforded by such agents is often concentration dependent. The following list of references are illustrative of the types of ultraviolet absorbers commonly used in conjunction with polymeric materials sensitive to photodegradation: U.S. Pat. Nos. 3,362,929; 3,362,930; 3,829,292; 3,901,849; 3,910,918; 3,939,164; 4,028,334; published patent application Nos. B402,162 and B571,638; U.K. Pat. No. 999,806; and an article appearing in J. AM. CHEM. SOC., Vol. 60: 1458 et seq. (1938). In addition, commonly assigned U.S. patent application Ser. Nos. 697,345 (now U.S. Pat. No. 4,073,770) and 697,387 (now U.S. Pat. No. 4,069,195) (both filed on June 18, 1976) disclose compounds which are highly effective as ultraviolet light stabilizers for polymeric materials. The compounds disclosed in the above referenced pending patent applications are substituted decahydroquinolines and are highly effective in enhancing the resistance of polyolefins to photodegradation by ultraviolet light.

As will be readily appreciated, the addition of substantial amounts (in excess of 10 weight percent) of stabilizer materials to a polymer can often modify its intrinsic physical, chemical and/or electrical properties or the intrinsic properties of articles prepared therefrom. Moreover, the problems related to stabilizer diffusion complicate the effectiveness of the stabilization technology, especially where fluid contact of the polymer composition is contemplated. Thus, there is a continuing need for highly efficient ultraviolet light stabilizers which are both effective at low concentrations and resistant to diffusion and/or leeching by fluids which may come in contact with the polymer composition.

SUMMARY OF THE INVENTION

Accordingly, it is the object of this invention to remedy the above as well as related deficiencies in the prior art.

More specifically, it is the principal object of this invention to provide a polymer composition having enhanced resistance to photodegradation from irradiation by light within the ultraviolet region of the electromagnetic spectrum.

Another object of this invention is to provide a polymer composition having enhanced resistance to ultraviolet light degradation, yet containing low concentrations of stabilizer compounds.

Yet another object of this invention is to provide a stabilized polymer composition wherein the stabilizer is relatively immobile within the polymer.

Still yet an additional object of this invention is to provide a method for enhancement of the resistance of ultraviolet light sensitive polymers to photodegradation thereby prolonging their useful life in a degradative environment.

The above and related objects are achieved by providing a composition containing an ultraviolet light sensitive polymer and, in an amount sufficient to enhance the resistance of said polymer to photodegradation, a stabilizer polymer having structural units corresponding to the following formula:

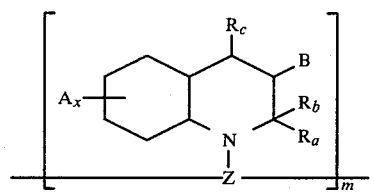

wherein $R_a$, $R_b$, and $R_c$ are independently selected from alkyl groups containing 1 to about 12 carbon atoms, a cyclohexyl group, or cyclohexylalkyl groups containing 7 to about 14 carbon atoms; A is selected from the group consisting of alkyl groups containing 1 to about 18 carbon atoms, alkoxy groups containing 1 to about 12 carbon atoms in the group, ester groups containing a total of from 2 to about 24 carbon atoms in the group, a cyclohexyl group, cyclohexylalkyl groups containing 7 to about 14 carbon atoms in the group, hydroxy groups, amino groups and aminoalkyl groups and alkyl-substituted amino and aminoalkyl groups wherein the alkyl contains 1 to about 12 carbon atoms; Z is a segment of the polymer backbone derived from an olefinic monomer; x is 0, 1, 2 or 3; and B is hydrogen, an alkyl group containing 1 to about 12 carbon atoms, a cyclohexyl groups, or a cyclohexylalkyl group of 7 to about 14 carbon atoms in the group; and m is at least 2.

This stabilizer polymer can be present in the composition as a physically distinct entity or chemically bonded to the ultraviolet light sensitive polymer. In one of the preferred embodiments of this invention, the stabilizer polymer is chemically engrafted upon the ultraviolet light sensitive polymer. In another of the preferred embodiments of this invention, the stabilizer polymer is present in the composition as a copolymer with either the ultraviolet light sensitive polymer or with polymers which are relatively insensitive to photodegradation by ultraviolet light (e.g. 4-vinylpyridine).

DESCRIPTION OF THE INVENTION INCLUDING PREFERRED EMBODIMENTS

The compositions of this invention can be prepared by simply combining the ultraviolet light sensitive polymer and the stabilizer polymer in a common solvent and thereafter evaporating the solvent to yield an ultraviolet light sensitive polymer resin. This resin, which is thus recovered, can be subsequently formed into a variety of articles by a conventional means. The term "photodegradation" as used herein with reference to the ultraviolet light sensitive polymeric materials is inclusive of any photo-induced change in the physical, chemical and/or electrical properties of the polymer or articles prepared therefrom.

Ultraviolet light sensitive polymers of the compositions of this invention include any polymeric material that manifests degradation upon exposure to ultraviolet light. Such degradation can include discoloration and/or embrittlement. Representative of such polymeric materials include the polyurethanes, PVC resins, ABS resins, polystyrene, polyacrylonitrile, polymethacrylates, polycarbonates, varnish, phenol-formaldehyde resins, polyepoxides, polyesters, and polyolefins (homo and copolymers of polyethylene, polypropylene, ethylene-propylene copolymers, ethylene-vinyl acetate copolymers) and the like. In the preferred compositions of this invention, the ultraviolet light sensitive polymers are derived from α-monoolefin monomers such as ethylene, propylene, isobutylene, 1-butene, 1-pentene, 1-hexene, 4-methyl-1-pentene, and the like.

The stabilizer polymers used in conjunction with the ultraviolet light sensitive polymers can be prepared by techniques generally disclosed in the open literature. The preferred stabilizer polymers of the compositions of this invention include the following:

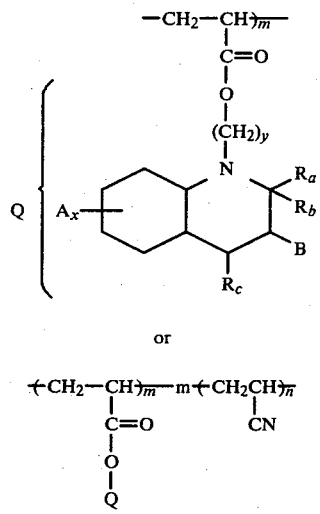

or

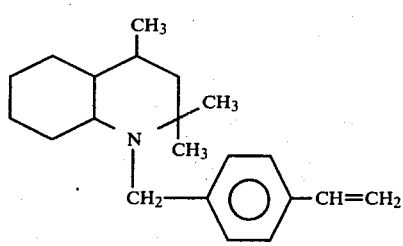

and wherein $R_a$, $R_b$, $R_c$, A and B are as previously defined; y can be 1–4; and m is the number of stabilizer units in the polymer and n is the number of nonstabilizer units in the polymer with the proviso that m>n.

Stabilizer polymers which are especially preferred for use in the compositions of this invention are derived from monomers represented by the following formulae:

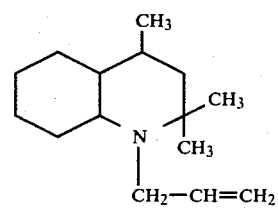

-continued

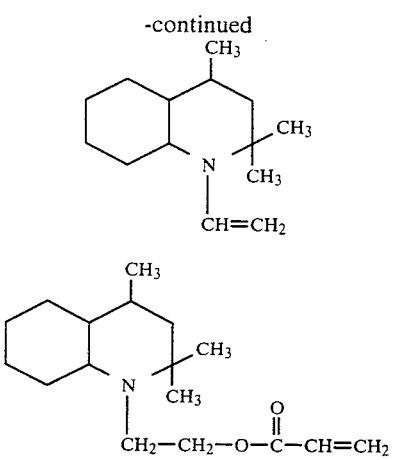

The above monomers can be readily combined with any of the ultraviolet light sensitive polymers referred to hereinabove, or copolymerized with monomers which are not noted for their sensitivity to ultraviolet degradation. Moreover, the above monomers can also be copolymerized with monomers having pendant functional groups capable of further stabilization of the polymer composition to other degradative forces. In addition to the various ingredients referred to hereinabove, the stabilizer compositions of this invention can also include other optional ingredients. Such optional ingredients can be selected from among the metal oxides, such as zinc, calcium and magnesium oxide; fatty acids, such as stearic, lauric acid and the metal and ammonium salts thereof; fillers, such as calcium and magnesium carbonate, calcium and barium sulphates, aluminum silicates, asbestos, and the like; plasticizers and extenders such as dialkyl and diaryl organic acids, typically diisobutyl, diisooctyl, diisodecyl and dibenzyl oleate, stearates, sebacates, azelates, phthalates, and the like; ASTM Type II petroleum oils, paraffinic oils, castor oil, tall oil, glycerin, and the like; antioxidants, such as 2,6-di-t-butyl paracresol, 2,2'-methylene-bis-(4-methyl-6-t-butylphenol), 2,2'-thio-bis-(4-methyl-6-t-butylphenol), 2,2'-methylene-bis-(6-t-butyl-4-ethylphenol), 4,4'-butylidene-bis-(6-t-butyl-m-cresol), 2-(4-hydroxy-3,5-di-t-butylaniline), 4,6-bis-(octylthio)-1,3,5-triazine, hexahydro-1,3,5-tris-β-(3,5-di-t-butyl-4-hydroxyphenyl)-propionyl-s-triazine, tris-(3,5-di-t-butyl-4-hydroxybenzyl)-isocyanurate, tetrakis-methylene-3 (3',5'-di-t-butyl-4'-hydroxyphenyl)propionate methane, distearylthiodipropionate, dilaurylthiodipropionate, tri(nonylphenyl) phosphite, tinthioglycolate, and the like; and other ingredients including pigments, tackifiers, flame retardants, fungicides and the like.

Optional compounding ingredients of particular interest for use in conjunction with stabilizer polymers of this invention are the antioxidant stabilizers. The addition of such antioxidant stabilizers to the polymer confers upon the resulting composition protection against oxidative degradation whereas the stabilizer polymer prevents photodecomposition by ultraviolet light. The combined benefits of such stabilizer agents is to provide a composition which is resistant to the major degradative forces encountered in the ambient environment. The type of antioxidant especially preferable for use in compositions of this invention include the phenolic antioxidants available in the art. Examples of such phenolic antioxidants are 2,6-di-t-butylphenol; 2-methyl-4,6-dinonylphenol; 2,6-di-t-butyl-p-cresol; 2,2'-methylene-bis(4-methyl-6-t-butyl-phenol); 1,1'-methylene-bis(2-naphthol); 4,4'-methylene-bis(2,6-di-t-butyl-phenol); 4,4'-thio-bis(6-t-butyl-m-cresol), and the like. Although any of the phenolic antioxidants referred to above would, in combination with the polymeric stabilizers, confer enhanced heat resistance and oxygen stability upon the resulting composition, the more preferred phenolic antioxidants are those having alkyl hydroxyl phenol substituents on an ester or a heterocyclic nucleus.

The stabilizer polymer and the other optional compounding ingredients can be readily admixed with the ultraviolet light sensitive polymeric materials using known mixing techniques and equipment. Typically such materials can be combined using a Banbury mixer, a Henschel mixer, a rubber mill, an extruder mixer or other equivalent apparatus. Standard mixing times and temperatures can be employed. The objective is to obtain an intimate and uniform dispersion of the stabilizing agents within the polymeric composition. The range of concentration of stabilizer agents relative to the ultraviolet light sensitive polymer should preferably be maintained within a range of from about 0.05 parts by weight stabilizer polymer per one hundred parts by weight ultraviolet light sensitive polymer to about 5 parts by weight stabilizer polymer per one hundred parts ultraviolet light sensitive polymer. The preferred content of stabilizer in the polymer composition is typically in the range of from about 0.1 parts by weight stabilizer polymer per one hundred parts ultraviolet light sensitive polymer to about 1 part by weight stabilizer polymer per one hundred parts by weight ultraviolet light sensitive polymer. As indicated previously, the stabilizer polymer can be present in the polymer composition as a copolymer. Of course, the range of relative concentrations set forth immediately preceding is based upon the concentration of the stabilizer segment of such copolymer.

The ultraviolet light stability of the compositions of this invention is evaluated by exposing a prepared sample of the composition to an Xenon or carbon arc light in a Weather-Ometer operating at a temperature, of for example, about 140° F. (60° C.). Degradation of the sample is monitored periodically by measuring the carbonyl absorption band at 1720 cm$^{-1}$ using an IR spectrophotometer. The formation of carbonyl groups indicates photodegradation of the sample. The details of such test procedures are documented in the open literature and can be found in the book entitled "Photodegradation, Photooxidation and Photostabilization of Polymers" by Ramby and Rabek, John Wiley & Sons, New York City (1975) at pages 129 et seq, and is also disclosed in U.S. Pat. No. 3,909,493. The samples are further evaluated visually for cracks by flexure at 180° F. In addition, the sample can be evaluated for oxidative and thermal stability by measuring the time required for discoloration and/or embrittlement of the sample by aging in a heated oven operated at 140° C.

EXAMPLES

The examples which follow further define, describe and illustrate the preparation and evaluation of the compositions of this invention. Apparatus and techniques used in such preparation and evaluation are standard or as hereinbefore described. Parts and percentages appearing in such examples are by weight unless otherwise indicated.

EXAMPLE I

Preparation of
N-(2-acryloxyethyl)-2,2,4-trimethyldecahydroquinoline

Following the method described in U.S. Pat. No. 3,872,161, the title compound was prepared by reacting 1 mole of 1-(2-hydroxyethyl)-2,2,4-triethyldecahydroquinoline (hereinafter referred to as HETDQ) with 3 moles methylacrylate in the presence of 0.8 gram phenothiazine and 13 grams zinc carbonate. The above mixture was heated to 87° C. in a 1 liter 3-necked flask equipped with a fractionating column. The pot temperature was gradually increased to a maximum of 164° C. while methanol and other lower boiling point liquid fractions were collected. The reaction took four days.

The resulting reaction mixture was diluted with ethanol and filtered. Solvents were removed from the above filtrate and fractionated under vacuum. The fraction which boiled at 105° to 109° C. (0.25 mmHg) was the desired product. It is a clear liquid and weighed 53.2 gms.

Calculated for $C_{17}H_{29}NO_2$: C, 73.07; H, 10.46; N, 5.01. Found: C, 73.61; H, 11.24: N, 5.18.

EXAMPLE II

Preparation of
N-(2-hydroxy-3-methacryloxypropyl)-2,2,4-trimethyldecahydroquinoline In a 500 ml 3-neck flask were placed 0.62 mole of 2,2,4-trimethyldecahydroquinoline (hereinafter referred to as TDQ), 0.62 mole of glycidyl methacrylate, 0.5 gram p-toluene sulfonic acid, 0.5 gram p-hydroquinone, and 5 mls of ethanol. The above mixture was heated and allowed to react overnight. The maximum pot temperature was approximately 188° C.

The following day, the reaction mixture was filtered with methanol. The filtrate was concentrated on an evaporator, and the residue fractionated to give 54.9 grams of a pale yellow syrup, b.p. 149°–153° C. (0.25 mmHg).

Calculated for $C_{19}H_{33}NO_3$: C, 70.55; H, 10.28; N, 4.33. Found: C, 70.29; H, 10.66; N, 4.33.

EXAMPLE III

Preparation of
N-(2-methacryloxyethyl)-2,2,4-trimethyldecahydroquinoline

Following the method described in U.S. Pat. No. 3,172,856, 0.61 moles of HETDQ were reacted with 0.61 moles of methacrylic acid in the presence of 0.3 grams hydroquinone and 0.4 grams of sodium acid sulphate. Xylene (400 mls) was used as a solvent. The above mixture was stirred for an hour, then heated to reflux overnight. A total of 10.3 mls of water was collected. Xylene was removed from the reaction mixture and the desired product isolated by fractionating at reduced pressures. The fraction which boiled at 144°–146° C. (0.7 mmHg) gave a satisfactory elemental analysis. A total of 134.3 grams (75% of theoretical yield) was produced and isolated.

Calculated for $C_{18}H_{31}NO_2$: C, 73.67; H, 10.65; N, 4.77. Found: C, 73.63; H, 10.86; N, 4.66.

EXAMPLE IV

Preparation of a copolymer from
N-(2-acryloxyethyl)-2,2,4-trimethyldecahydroquinoline
and
2-hydroxyl-4-(2-hydroxy-3-methacryloxy)propoxybenzophenone In a 500 ml 3-necked flask were placed 0.05 mole of N-(2-acryloxyethyl)-2,2,4-trimethyldecahydroquinoline (prepared in the manner described in Example I), 0.05 mole 2-hydroxy-4-(2-hydroxy-3-methacryloxy)propoxybenzophenone, 0.4 gram azobisisobutyronitrile (hereinafter referred to as AIBN), and 250 mls tetrahydrofuran. The above mixture was stirred under a nitrogen atmosphere, gradually heated to reflux and allowed to react for 3 days with mild agitation. The solvent was subsequently removed from the reaction mixture by evaporation. The residue remaining in the flask was taken up with methanol and the desired product isolated by centrifugation. A total of 9.2 grams pale yellow solids were obtained. The pale yellow solid was subjected to NMR spectroanalysis. The results of such evaluation indicate that the product contained 42.2 mole percent of 2,2,4-trimethyldecahydroquinoline groups, and 57.8 mole percent benzophenone functional groups. Elemental analysis showed 67.28% carbon, 7.42% hydrogen and 1.50% nitrogen.

EXAMPLE V

Preparation of copolymers from acrylonitrile and
N-(2-methylacryloxyethyl)-2,2,4-trimethyldecahydroquinoline Following essentially the same procedure as described in Example IV, 0.1 mole of N-(2-methacryloxyethyl)-2,2,4-trimethyldecahydroquinoline was reacted with 0.1 mole of acrylonitrile in the presence of 0.4 gram AIBN and 120 mls of 2-propanol.

The 2-propanol used as the polymerization medium is degassed with nitrogen prior to initiation of the polymerization.

The reaction mixture was stirred and heated gradually to reflux and the reaction allowed to continue overnight. Two separate layers were formed within the reaction vessel. The upper layer was removed by decantation and then ethanol was added to the lower layer, thereby forming a precipitate. The precipitated material was washed twice with alcohol and dried in a vacuum oven. The dried solid was ground and sieved through 60 mesh screening. The off-white powder thus recovered, (approximately 17.3 grams) had a melting point in the range of 104°–114° C. and was insoluble in dimethylsulfoxide (DMSO).

EXAMPLE VI

Preparation of copolymer from
N-(2-methacryloxyethyl)-2,2,4-trimethyldecahydroquinoline and
2-hydroxy-4-(2-hydroxy-3-methacryloxy)propoxybenzophenone Following essentially the same procedures described in Example IV, about 0.1 mole of N-(2-methacryloxyethyl)-2,2,4-trimethyldecahydroquinoline was reacted with 0.1 mole of 2-hydroxy-4-(2-hydroxy-3-methacryloxy)propoxybenzophenone in the presence of 0.4 gram AIBN in 100 milliliters of dried benzene.

The reaction mixture was gradually heated to reflux and allowed to react overnight. The resulting mixture was triturated with hexane thereby forming a solid material. The solids thus formed are ground in a mortar and pestile and thereafter separated from hexane by filtration. The recovered solids are dried in a vacuum oven, ground and sieved through a number 60 mesh screen. The solids thus recovered weighed approximately 22.6 grams and had a softening point of about 114° C. Elemental analysis of the polymeric sample revealed 70.4% C and 8.18% H, and 2.23% N. Further extraction of the reaction medium with acetone followed by hexane yielded additional copolymer. Infrared spectral analysis confirmed the subsequently recovered materials to be identical to that originally obtained.

EVALUATION OF EFFICACY OF TITLE COMPOUNDS OF EXAMPLES I THROUGH VI

Each of the title compounds of Examples I through VI is separately combined with a polypropylene resin in a common solvent and a 10 mil thick film prepared therefrom by conventional drawbar coating techniques. A polypropylene film is also prepared wherein a commercially available UV stabilizer Tinuvin 327 is added (Tinuvin 327 is a substituted α-hydroxyphenylbenzotriazole available from Ciba-Geigy Corporation). All the above samples also contain an optional antioxidant, GOOD-RITE 3125, a triester of a substituted cinnamic acid and 1,3,5-tris[2-hydroxyethyl]-s-triazine-2,4,6-trione available from the BFGoodrich Company.

The ultraviolet light stability of each of the films prepared from the above compositions was evaluated by exposing the film sample to an Xenon lamp in a Weather-Ometer (Atlas Weather-Ometer Model 60-W) maintained at about 60° C. Degradation of the sample is monitored periodically by measuring the carbonyl absorption band at 1720 cm$^{-1}$ using an IR spectrophotometer. The table which follows indicates the relative stability of the films prepared from the above compositions. The number of hours listed indicated the duration of time prior to the onset of photodegradation.

TABLE

| Stabilizer Present IN Film Sample | Parts per hundred of stabilizer in Polypropylene film | Elapsed Time in Hours Prior to the Onset of Photodegradation |
|---|---|---|
| Tinuvin 327 | 0.50 | 700 |
| Example I | 0.50 | 1580 |
| Example II | 0.50 | 1200 |
| Example III | 0.50 | 1280 |
| Example IV | 0.50 | 700 |
| Example V | 0.50 | 870 |
| Example VI | 0.50 | 700 |

As is evident from the above results, the polymer compositions stabilized with the title compounds of Examples I through VI have enhanced stabilization to photodegradation by ultraviolet light.

The foregoing Examples are provided as illustrative of some of the preferred embodiments of this invention and not intended to delineate the scope thereof, which is set forth in the following claims.

We claim:

1. A polymer composition comprising a polymer which is sensitive to degradation from ultraviolet light irradiation and, in an amount sufficient to enhance said polymers' resistance to such degradation, a stabilizer polymer having structural units corresponding to the following formula:

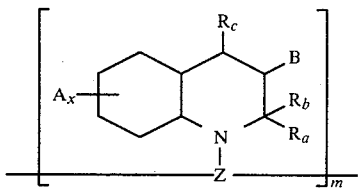

wherein $R_a$, $R_b$, and $R_c$ are independently selected from alkyl groups containing 1 to about 12 carbon atoms, a cyclohexyl group, or cyclohexylalkyl groups containing 7 to about 14 carbon atoms; A is selected from the group consisting of alkyl groups containing 1 to about 24 carbon atoms, hydroxyalkyl groups containing 1 to about 18 carbon atoms, alkoxy groups containing 1 to about 12 carbon atoms in the group, ester groups containing a total of from 2 to about 24 carbon atoms in the group, a cyclohexyl group, cyclohexylalkyl groups containing 7 to about 14 carbon atoms in the group, hydroxy groups, amino groups and aminoalkyl groups and alkyl-substituted amino and aminoalkyl groups wherein the alkyl contains 1 to about 12 carbon atoms; Z is a segment of the polymer backbone derived from an olefinic monomer, X is 0, 1, 2 or 3; and B is hydrogen, an alkyl group containing 1 to about 12 carbon atoms, a cyclohexyl group, or a cyclohexylalkyl group of 7 to about 14 carbon atoms in the group; and m is at least 2.

2. The composition of claim 1 wherein the stabilizer polymer comprises structural units derived from the monomer, N-(2-acryloxyethyl)-2,2,4-trimethyl-decahydroquinoline.

3. The polymer composition of claim 1 wherein the stabilizer polymer comprises structural units derived from the monomer, N-(2-hydroxy-3-methacryloxypropyl)-2,2,4-trimethyldecahydroquinoline.

4. The polymer composition of claim 1 wherein the stabilizer polymer comprises structural units derived from the monomer, N-(2-methacryloxyethyl)-2,2,4-trimethyldecahydroquinoline.

5. The polymer composition of claim 2 wherein the stabilizer polymer also comprises structural units derived from the monomer 2-hydroxy-4-(2-hydroxy-3-methacryloxy)propoxybenzophenone.

6. The polymer composition of claim 4 wherein the stabilizer polymer also comprises structural units derived from the monomer acrylonitrile.

7. The polymer composition of claim 4 wherein the stabilizer polymer also comprises structural units derived from the monomer 2-hydroxy-4-(2-hydroxy-3-methacryloxy)propoxybenzophenone.

8. A method for enhancing the resistance of a polymer to degradation by ultraviolet light, said method comprising incorporating within said ultraviolet light sensitive polymer a stabilizer effective amount of a polymer corresponding to the following structural formula:

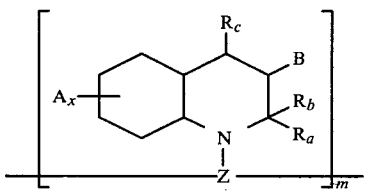

wherein $R_a$, $R_b$, and $R_c$ are independently selected from alkyl groups containing 1 to about 12 carbon atoms, a cyclohexyl group, or cyclohexylalkyl groups containing 7 to about 14 carbon atoms; A is selected from the group consisting of alkyl groups containing 1 to about 24 carbon atoms, hydroxyalkyl groups containing 1 to about 18 carbon atoms, alkoxy groups containing 1 to about 12 carbon atoms in the group, ester groups containing a total of from 2 to about 24 carbon atoms in the group, a cyclohexyl group, cyclohexylalkyl groups containing 7 to about 14 carbon atoms in the group, hydroxy groups, amino groups and aminoalkyl groups and alkyl-substituted amino and aminoalkyl groups wherein the alkyl contains 1 to about 12 carbon atoms; Z is a segment of the polymer backbone derived from an olefinic monomer, X is 0, 1, 2 or 3; and B is hydrogen, an alkyl group containing 1 to about 12 carbon atoms, a cyclohexyl group, or a cyclohexylalkyl group of 7 to about 14 carbon atoms in the group; and m is at least 2.

9. A polymer corresponding to the following structural formula

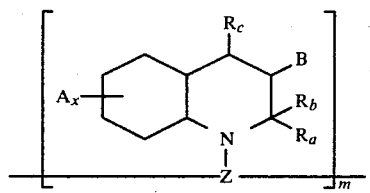

wherein $R_a$, $R_b$, and $R_c$ are independently selected from alkyl groups containing 1 to about 12 carbon atoms, a cyclohexyl group, or cyclohexylalkyl groups containing 7 to about 14 carbon atoms; A is selected from the group consisting of alkyl groups containing 1 to about 24 carbon atoms, hydroxyalkyl groups containing 1 to about 18 carbon atoms, alkoxy groups containing 1 to about 12 carbon atoms in the group, ester groups containing a total of from 2 to about 24 carbon atoms in the group, a cyclohexyl group, cyclohexylalkyl groups containing 7 to about 14 carbon atoms in the group, hydroxy groups, amino groups and aminoalkyl groups and alkyl-substituted amino and aminoalkyl groups wherein the alkyl contains 1 to about 12 carbon atoms; Z is a segment of the polymer backbone derived from an olefinic monomer, X is 0, 1, 2 or 3; and B is hydrogen, an alkyl group containing 1 to about 12 carbon atoms, a cyclohexyl group, or a cyclohexylalkyl group of 7 to about 14 carbon atoms in the group; and m is at least 2.

* * * * *